3,109,853
CYCLIC COMPOUNDS OF ANTIMONY AND BISMUTH
Michael Worsley, Bruce N. Wilson, and Blaine O. Schoepfle, Niagara Falls, N.Y., assignors to Hooker Chemical Corporation, Niagara Falls, N.Y., a corporation of New York
No Drawing. Filed Apr. 22, 1960, Ser. No. 23,903
13 Claims. (Cl. 260—446)

The present invention relates to novel cyclic compounds and the process for obtaining them. More particularly, the present invention resides in antimony or bismuth containing cyclic compounds having the following structural formulas, derivatives thereof, and the process for obtaining them.

(A)

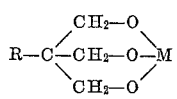

or (B)

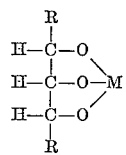

wherein R is selected from the group consisting of hydrogen, alkyl, substituted alkyl, and mixtures thereof, and wherein M is selected from the group consisting of antimony and bismuth.

The compounds of the present invention may be conveniently prepared by reacting together at least one mole of an aliphatic alcohol having at least three hydroxyl groups per unit atomic weight of metallic element in a trivalent antimony or bismuth compound selected from the group consisting of an oxide, chloride, oxychloride and ester. It is surprising and unexpected to find that in accordance with the present invention the above reaction yields the cyclic compounds of the present invention. Reactions of this type would be expected to give cross-linked or linear polymeric materials.

It is therefore, an object of the present invention to provide a process for preparing novel cyclic compounds containing antimony or bismuth and derivatives thereof.

It is a further object of the present invention to prepare these cyclic compounds and derivatives thereof simply and expeditiously.

It is a further object of the present invention to provide novel cyclic compounds containing antimony or bismuth and derivatives thereof, which compounds are useful for a wide variety of purposes.

Further objects and advantages of the present invention will appear hereinafter.

According to the present invention we have found that new and useful cyclic compounds having the following structural formulas:

(A)

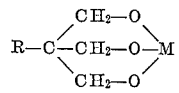

or (B)

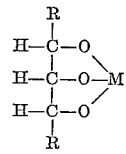

wherein R is selected from the group consisting of hydrogen, alkyl, substituted alkyl, and mixtures thereof, and wherein M is selected from the group consisting of antimony and bismuth, may be prepared by reacting together at least one mole of an aliphatic alcohol having at least three hydroxyl groups per unit atomic weight of the metallic element in a trivalent antimony or bismuth compound selected from the group consisting of an oxide, chloride, oxychloride and ester. Derivatives of the above compounds may be prepared by simply reacting with a material selected from the group consisting of chlorine, fluorine, bromine, and a peroxygen compound.

The compounds of the present invention may be conveniently prepared in accordance with the following equations, wherein antimony trioxide is shown for purposes of illustration:

(A)

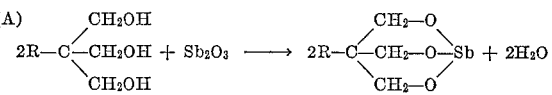

(B)

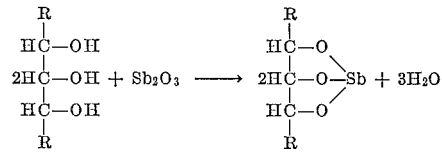

wherein R is as defined above. In the above reaction at least one mole of the alcohol is reacted with one unit atomic weight of the metallic element in a trivalent antimony or bismuth oxide, chloride, oxychloride or ester. It should be noted that the reaction with bismuth oxychloride is slow. A solvent may be employed if desired and is preferably employed if the alcohol used does not melt below one hundred and ninety degrees centigrade, illustrative of such alcohols are pentaerythritol, trimethylol ethane, etc. When a solvent is used it should generally boil above about one hundred and fifty degrees centigrade, and it must be substantially unreactive with the reactants or reaction products under the conditions of the reaction, or not form stable reaction products under the conditions of the reaction. Typical solvents that may be advantageously employed include phenol, ortho-, para-, or meta-dichlorobenzene, diethyl carbitol, etc. Water scavengers, such as ketals, may be advantageously used to facilitate more rapid reactions. If no solvent is employed, excess alcohol is preferably used in order to provide a suitable reaction medium. The reaction times and temperatures are not critical and will naturally vary depending upon the reactants employed and degree of completion of reaction desired, and also the time will vary with the temperature and the temperature will vary with the time. Generally speaking, however, the reaction is continued for from fifteen minutes to ten hours, preferably forty-five minutes to four hours, at a temperature of from about one hundred and thirty to two hundred and ten degrees centigrade. The cyclic product thereby obtained may then be separated from the reaction mixture by procedures known to the art.

Illustrative alcohols which may be used in the present invention include the following: pentaerythritol, dipentaerythritol, polypentaerythritol, trimethylol propane, trimethylol ethane, trimethylol butane, trimethylol isobutane, trimethylol pentane, trimethylol hexane, trimethylol octane, trimethylol nonane, trimethylol undecane, trimethylol heptadecane, trimethylol propene, trimethylol butene, trimethylol pentene, glycerol, sorbitol, hexanetriol, butanetriol, etc. In addition, the alcohols may be substituted with non-interfering substituents such as chloro-, bromo-, fluoro-, iodo-, aryl, such as phenyl, naphthyl, etc. When a trimethylol alkane is employed the alkane group preferably contains from one to ten carbon atoms, due to availability.

Typical trivalent antimony or bismuth compounds which may be employed in the present invention include the following: antimony trioxide, bismuth trioxide, antimony trichloride, bismuth trichloride, antimony oxychloride, bismuth oxychloride, and esters having the following structural formula:

wherein M is as defined above and wherein $R_1$ is an anion of an alcoholate having less than thirteen carbon atoms. Among such esters are those made by reacting an epoxide with antimony or bismuth trichloride to give a $\beta$-chloro antimonous acid or a $\beta$-chloro bismuthous acid. Some examples of these $\beta$-chloro compounds are tris(2-chloroethyl) antimonite, tris(2-chlorobutyl) antimonite, tris(2-chloro-2-phenylethyl) antimonite, tris(2-chloroethyl) bismuthite, tris(2-chloropropyl) bismuthite, etc. Also among such esters are those made by the reaction of organic monohydroxy compounds with antimony or bismuth trioxide, or antimony or bismuth trichloride. Some examples of these are as follows: tris(2-ethylhexyl) antimonite, tris(n-octyl) antimonite, tribenzyl antimonite, triphenyl antimonite, tris(2-ethylhexyl) bismuthite, tris(n-octyl) bismuthite, tribenzyl bismuthite, triphenyl bismuthite, etc.

Derivatives of the compounds of the present invention may be simply and expeditiously prepared by reacting one mole of the trivalent compounds of the present invention with up to one mole of a material selected from the group consisting of chlorine, fluorine, bromine, and a peroxygen compound. By up to one mole, it is meant that an excess may be used, but only up to one mole will react. A solvent is preferably employed in order to facilitate the reaction. The solvent must be substantially unreactive with the reactants or reaction products under the conditions of the reaction, or not form stable reaction products under the conditions of the reaction. Typical solvents that may be advantageously employed include carbon tetrachloride, ortho-, para- or meta-dichlorobenzene, diethyl carbitol, water, perchloroethylene, etc.

The time and temperature are not critical and will naturally vary depending upon the reactants employed, and degree of completion of reaction desired, and also the time will vary with the temperature and the temperature will vary with the time. Generally, extended reaction times at high temperatures, i.e., reaction for at least one hour at from ninety to two hundred degrees centigrade will yield derivatives having an average valency state approximating five, i.e., almost complete reaction of the trivalent compounds of the present invention. Shorter reaction times or correspondingly lower temperatures will yield derivatives having a correspondingly lower average valency state, i.e., a valency state approximating four and designating incomplete reaction of the trivalent derivatives. Generally speaking, in order to obtain derivatives of the trivalent compounds of the present invention the reaction temperatures may vary from fifty to two hundred degrees centigrade for at least ten minutes.

The peroxygen employed include any of the following compounds: isopropyl peroxydicarbonate, methyl ethyl ketone peroxide, cyclohexanone peroxide, cyclohexyl hydroperoxide, cumene hydroperoxide, t-butyl hydroperoxide, methyl amyl ketone peroxide, acetyl peroxide, methyl cyclohexyl hydroperoxide, t-butyl perbenzoate, t-butyl perphthalic acid, t-butyl peracetate, di-t-butyl peroxide, and hydrogen peroxide or mixtures thereof. Some of the liquid peroxides are ordinarily supplied as solutions in materials such as tricresyl phosphate, dimethyl phthalate or the like. These solutions may also be used in preparing the derivatives of the present invention.

In addition to preparing the cyclic compounds of the present invention, novel cyclic antimony or bismuth compounds may be prepared by reacting together under similar conditions to those depicted herein the aforementioned antimony or bismuth compounds with a compound containing three NH groups, three SH groups, three COOH groups, three phenolic OH groups, and mixtures thereof. In addition, the cyclic compounds of the present invention are readily reactive with nitrogen containing compounds, such as tertiary amines, to give coordination derivatives.

The cyclic compounds of the present invention are surprising in their wide range of utility. They are highly crystalline, and therefore, are not readily attacked by moisture, and can be handled readily without hydrolysis. Antimony and bismuth compounds of similar molecular weight, but without the cyclic structure, hydrolize quite rapidly in contact with air, see copending application Ser. No. 688,111, "Flame Resistant Polyester Compositions Containing Antimony," filed October 4, 1957 now U.S. Patent 3,031,425.

The compounds of the present invention are useful as antioxidants for natural and synthetic rubbers, and as antioxidants for fats and oils. The compounds of the present invention react rapidly with HCl, and therefore, function as vinyl stabilizers. In addition to this, the compounds of the present invention are useful as light stabilizers for chlorinated materials. Furthermore, the compounds of the present invention find utility as flame retardant additives, especially in hydroxyl containing materials and urethane foams, where the compounds of the present invention do not cause brittleness such as is caused by antimony trioxide, sodium antimony tartrate or sodium antimonate. The compounds of the present invention are also useful as catalysts, for example, for the reaction between an active hydrogen-containing material and an epoxide. Dibutyltin dilaurate, when used in polyurethane foams, causes oxidative instability. A small amount of the antimony compound of the present invention will rectify this. Some of the compounds of the present invention exhibit intumescent properties, and these may be useful in fire extinguishing applications. Some of the compounds of the present invention sublime at high temperatures. Thus, finding use in heat control applications. The compounds of the present invention also find utility as gasoline additives.

The antimony compounds of the present invention are preferred due to lower cost and greater availability.

The following examples, given for the purpose of illustration, will further illustrate the present invention.

EXAMPLE 1

*Preparation of Trimethylolpropane Antimonite*

Trimethylolpropane (thirty grams) was added to a one-liter, three-necked round bottom flask fitted with a stirrer, thermometer and reflux condenser. Antimony trioxide (32.7 grams), and phenol (one hundred and fifty grams) was then added. The reaction vessel was then heated to the reflux temperature, approximately one hundred and eighty degrees centigrade, by means of a circulating oil bath. After the reaction mixture had refluxed for approximately one hour, the condenser was changed from a reflux to a distilling position with approximately one-half of the phenol being removed.

Ortho-dichlorobenzene (one thousand grams) was then added by means of a dropping funnel at such a rate as to displace the distillate of ortho-dichlorobenzene and phenol. After there was no longer any trace of phenol in the distillate, the reaction mixture was refluxed for four more hours. The reaction product was then washed with benzene, dried, and sublimed at one hundred and eighty degrees centigrade, five millimeters mercury, yielding fifty-four grams (95.7 percent yield) of white needle-shaped crystals, having a formula:

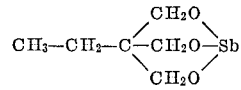

*Analysis.*—Calcd. for $C_6H_{11}O_3Sb$: C, 28.49 percent; H, 4.38 percent; Sb, 48.14 percent. Found: C, 28.60 percent; H, 4.81 percent; Sb, 48.1 percent.

Infrared indicated the absence of free hydroxyl groups.

EXAMPLE 2

*Preparation of Trimethylolethane Antimonite*

Trimethylolethane (thirty-five grams) was added to a one-liter, round bottom, three-necked flask fitted with a stirrer, thermometer and reflux condenser. Antimony trioxide (36.5 grams) and phenol (one hundred and fifty grams) was then added. The reaction was then heated to the reflux temperature, approximately one hundred and eighty degrees centigrade, by means of a circulating oil bath. After the reaction mixture had refluxed for approximately one hour, the condenser was changed from a reflux to a distilling position with approximately one-half of the phenol being removed. Ortho-dichlorobenzene (one thousand cc.) was then added by means of a dropping funnel at such a rate as to displace the distillate of ortho-dichlorobenzene and phenol. After there was no longer any trace of phenol in the distillate, the reaction mixture was refluxed for four more hours. The reaction product was then washed with benzene and dried, yielding 57.5 grams (96.8 percent yield) of needle-shaped white crystals having the formula:

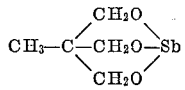

*Analysis.*—Calculated for $C_5H_9O_3Sb$: Sb, 50.1 percent. Found: Sb 50.36 percent.

Infrared indicated the absence of free hydroxyl groups.

EXAMPLE 3

*Preparation of Pentaerythritol Antimonite*

Pentaerythritol (thirty grams) was added to a one-liter, three-necked, round bottom flask fitted with a stirrer, thermometer, and reflux condenser. Antimony trioxide (38.1 grams) and one hundred and fifty grams of phenol was then added. The reaction vessel was then heated to the reflux temperature, approximately one hundred and eighty degrees centigrade, by means of a circulating oil bath. After the reaction mixture had refluxed for approximately one hour, the condenser was changed from a reflux to a distilling position with approximately one-third of the phenol being removed by the application of a slight amount of vacuum.

Accompanying the distillate was the water azeotrope which, once removed, permitted the solution of the reaction mixture in the residual phenol. Distillation was continued until approximately two-thirds of the phenol was removed and the reaction mixture became a thick slurry. Ortho-dichlorobenzene (one thousand cubic centimeters) was then added via a dropping funnel at such a rate as to permit complete removal of all the phenol. After no more phenol was found in the distillate, the reaction mixture was refluxed for about four hours. The reaction product was then washed with benzene, dried and sublimed, one hundred and eighty degrees centigrade and five millimeters mercury, yielding sixty-two grams (93.5 percent yield) of white needle-like crystals, having the formula:

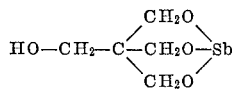

*Analysis.*—Calculated for $C_5H_9O_4Sb$: Sb, 47.9 percent. Found: Sb, 48.6 percent.

Infrared indicated the presence of free hydroxyl groups.

EXAMPLE 4

*Preparation of Glycerol Antimonite*

Three hundred grams of antimony trioxide and fifteen hundred grams of glycerol were charged into a three-liter, three-necked flask. The temperature was raised to one hundred and sixty degrees centigrade, at which temperature water was driven off. At the end of the reaction vacuum was applied and the glycerol was distilled until a thick paste remained. Ortho-dichlorobenzene was added and the remaining glycerol was azeotroped leaving highly crystalline glycerol antimonite suspended in the ortho-dichlorobenzene. The antimonite was filtered, washed with alcohol and dried. The resulting product had the following structural formula:

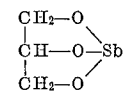

*Analysis.*—Calculated for $C_3H_6O_3Sb$: Sb, 57.76 percent. Found: Sb, 57.6 percent.

Infrared indicated the absence of free hydroxyl groups.

EXAMPLE 5

*Preparation of Trimethylolpropane Bismuthite*

Five hundred and thirty-six grams of trimethylolpropane and 93.2 grams of bismuth trioxide were reacted using phenol as a solvent. After the water was driven off the temperature was raised and the majority of the phenol distilled. Ortho-dichlorobenzene was added to distill the remaining phenol, leaving a yellow crystalline reaction product. The product was filtered, washed with benzene and dried in a vacuum oven. The resultant product had the following structural formula:

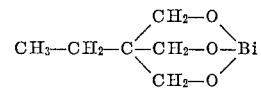

*Analysis.*—Calculated for $C_6H_{11}O_3Bi$: C, 21.18 percent; H, 3.26 percent; Bi, 61.44 percent. Found: C, 20.15 percent; H, 3.43 percent; Bi, 63.40 percent.

EXAMPLE 6

*Reaction of Trimethylolpropane Antimonite With Bromine*

25.3 grams of trimethylolpropane antimonite in one hundred milliliters of ortho-dichlorobenzene was heated to one hundred degrees centigrade. Sixteen grams of bromine was added over a period of two hours. After cooling, the reaction was filtered, washed with chloroform and dried in a vacuum oven at eighty degrees centigrade.

*Analysis.*—Calculated for $C_6H_{11}O_3SbBr_2$: Sb, 29.15 percent; Br, 38.9 percent. Found: Sb, 28.4 percent; Br, 40.5 percent.

EXAMPLE 7

*Reaction of Trimethylolpropane Antimonite With Chlorine*

Fifty grams of trimethylolpropane antimonite was heated with stirring in five hundred cubic centimeters of ortho-dichlorobenzene to a temperature of one hundred and fifty degrees centigrade. Chlorine gas was bubbled into the mixture until complete solution of the antimony compound into the ortho-dichlorobenzene was attained. The reaction mixture was cooled to room temperature yielding a water white material which when dried was a finely divided white powder.

*Analysis.*—Calculated for $C_6H_{11}O_3SbCl$: Sb, 41.64 percent; Cl, 11.5 percent. Found: Sb, 42.30 percent; Cl, 12.3 percent.

EXAMPLE 8

*Reaction of Trimethylolpropane Bismuthite With Bromine*

To 34.0 grams of trimethylolpropane bismuthite, in one hundred milliliters of ortho-dichlorobenzene at one hundred degrees centigrade, was added sixteen grams of bromine dropwise over a period of two hours. The temperature was gradually raised to one hundred and fifty degrees centigrade. Upon cooling yellow crystals deposited which were filtered, washed with chloroform and dried under vacuum.

*Analysis.*—Calculated for $C_6H_{11}O_3BiBr_2$: Br, 32.0 percent. Found: Br, 32.3 percent.

EXAMPLE 9

*Preparation of Flame Retardant Rigid Urethane Foams*

A rigid urethane foam was produced from:

one hundred grams of polyester prepared from five moles of trimethylolpropane and three moles of adipic and reacted to an acid number of one;
0.5 grams of silicone oil; and
0.7 grams of N,N,N',N'-tetramethyl-1,3-butanediamine, to which was added with rapid stirring:

one hundred and twenty-five grams of semiprepolymer prepared from seventy-five parts of tolylene diisocyanate isomers and twenty-five parts of a polyester prepared from 7.6 moles of glycerine, four moles of 1,4,5,6,7,7-hexachlorobicyclo - (2.2.1) - 5-heptene-2,3-dicarboxylic acid, and two moles of adipic acid reacted to an acid number of five;
thirty-five grams of trichlorofluoromethane; and
twenty grams of trimethylolpropane antimonite.

The foam expanded and cured at room temperature to produce a self-extinguishing foam of normal resilience. Attempts to use antimony trioxide, sodium antimonate or sodium antimony tartrate led to friable foams.

EXAMPLE 10

*Preparation of Flame Retardant Flexible Foam*

The following were mixed until a homogeneous suspension occurred:

one hundred and ninety-one grams of polyether, the reaction product of one mole of trimethylolpropane and 41.5 moles of propylene oxide; and
one hundred and seventeen grams of polyether, the reaction product of one mole of trimethylpropane and 24.5 moles of propylene oxide;
3.1 grams of silicone oil;
1.1 grams of dibutyltin dilaurate;
14.4 grams of water;
forty-seven grams of glycerol antimonite; and
ninety-three grams of
    perchloropentacyclo-(5.2.1.0$^{2,6}$.0$^{3,9}$.0$^{5,8}$)-decane Then one hundred and forty-nine grams tolylene diisocyanate isomers was added with rapid stirring. The liquid was poured into a mold and permitted to expand at room temperature for three minutes. The foam was placed in an oven for fifteen minutes at seventy-five degrees centigrade, crushed, then cured for one hour at one hundred and twenty degrees centigrade.

The foam was resilient, tough and flame retardant. Heat aging at one hundred and twenty degrees centigrade for two weeks showed no loss of resilience, while a similar sample without the glycerol antimonite was totally degraded in two days.

This invention may be embodied in other forms or carried out in other ways without departing from the spirit or essential characteristics thereof. The present embodiment is therefore, to be considered as in all respects illustrative and not restrictive, the scope of the invention being indicated by the appended claims, and all changes which come within the meaning and range of equivalency are intended to be embraced therein.

We claim:

1. The process which comprises reacting together (I) one mole of a compound selected from the group consisting of compounds having the following structural formulas:

(A)
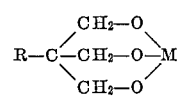

and (B)
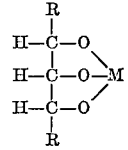

wherein R is selected from the group consisting of hydrogen, alkyl, substituted alkyl and mixtures thereof and wherein M is selected from the group consisting of antimony and bismuth, with (II) up to one mole of a compound selected from the group consisting of chlorine, fluorine and bromine in the presence of a solvent which is substantially unreactive with the reactants and reaction products, to obtain the corresponding pentavalent derivative of said member selected from the group consisting of antimony and bismuth.

2. Compounds selected from the group consisting of:

(A)
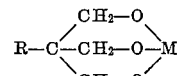

(B)
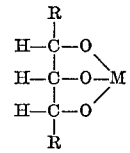

and (C) the reaction products thereof with materials selected from the group consisting of chlorine, fluorine and bromine, wherein R is selected from the group consisting of hydrogen, alkyl, substituted alkyl and mixtures thereof, and wherein M is selected from the group consisting of antimony and bismuth.

3. Compounds having the structural formula:

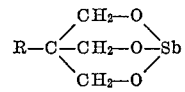

wherein R is an alkyl group.

4. Compounds having the structural formula:

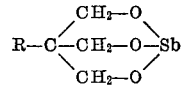

wherein R is selected from the group consisting of hydrogen and an alkyl group having 1 to 9 carbon atoms.

5. The compound having the structural formula:

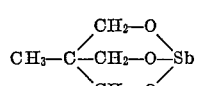

6. The compound having the structural formula:

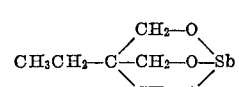

7. Compounds having the structural formula:

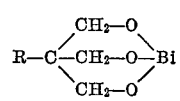

wherein R is an alkyl group.

8. Compounds having the structural formula:

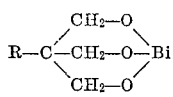

wherein R is selected from the group consisting of hydrogen and an alkyl group having 1 to 9 carbon atoms.

9. The compound having the structural formula:

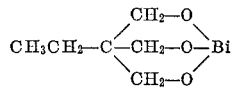

10. Reaction products of bromine and compounds having the structural formula:

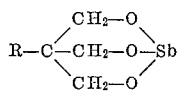

wherein R is an alkyl group.

11. Reaction products of chlorine and compounds having the structural formula:

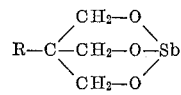

wherein R is an alkyl group.

12. Pentaerythritol antimonite.
13. Glycerol antimonite.

References Cited in the file of this patent

UNITED STATES PATENTS

| | | |
|---|---|---|
| 2,066,742 | Schmidt | Jan. 5, 1937 |
| 2,114,866 | Vaughn | Apr. 19, 1938 |
| 2,480,823 | Morris et al. | Sept. 6, 1949 |
| 2,839,554 | Haslam | June 17, 1958 |